United States Patent [19]

Ting

[11] 4,036,187

[45] July 19, 1977

[54] CLEAN SPARK IGNITION INTERNAL COMBUSTION ENGINE

[76] Inventor: Hui-tzeng Ting, P.O. Box 18, Crum Lynne, Pa. 19022

[21] Appl. No.: 667,409

[22] Filed: Mar. 16, 1976

Related U.S. Application Data

[63] Continuation-in-part of Ser. No. 376,304, July 5, 1973, abandoned.

[51] Int. Cl.² .................. F02B 19/10; F02B 19/16
[52] U.S. Cl. .................... 123/32 SP; 123/191 SP; 123/32 ST
[58] Field of Search ............ 123/32 ST, 32 SP, 75 B, 123/191 S, 191 ST

[56] References Cited

U.S. PATENT DOCUMENTS

| 2,156,665 | 5/1939 | Mallory | 123/32 ST |
| 3,079,901 | 3/1963 | Hallberg | 123/32 ST |
| 3,318,292 | 5/1967 | Hideg | 123/32 ST |
| 3,621,821 | 11/1971 | Jarnuszkiewicz | 123/32 ST |
| 3,937,188 | 2/1976 | Wrigley | 123/32 ST |

*Primary Examiner*—Ronald B. Cox

[57] ABSTRACT

A two or four-stroke spark ignition engine has fuel injectors located at or near BDC, and a separate recess in its cylinderhead to trap a lean mixture for causing more complete combustion of a rich mixture outside the recess after the rich mixture is ignited.

4 Claims, 5 Drawing Figures

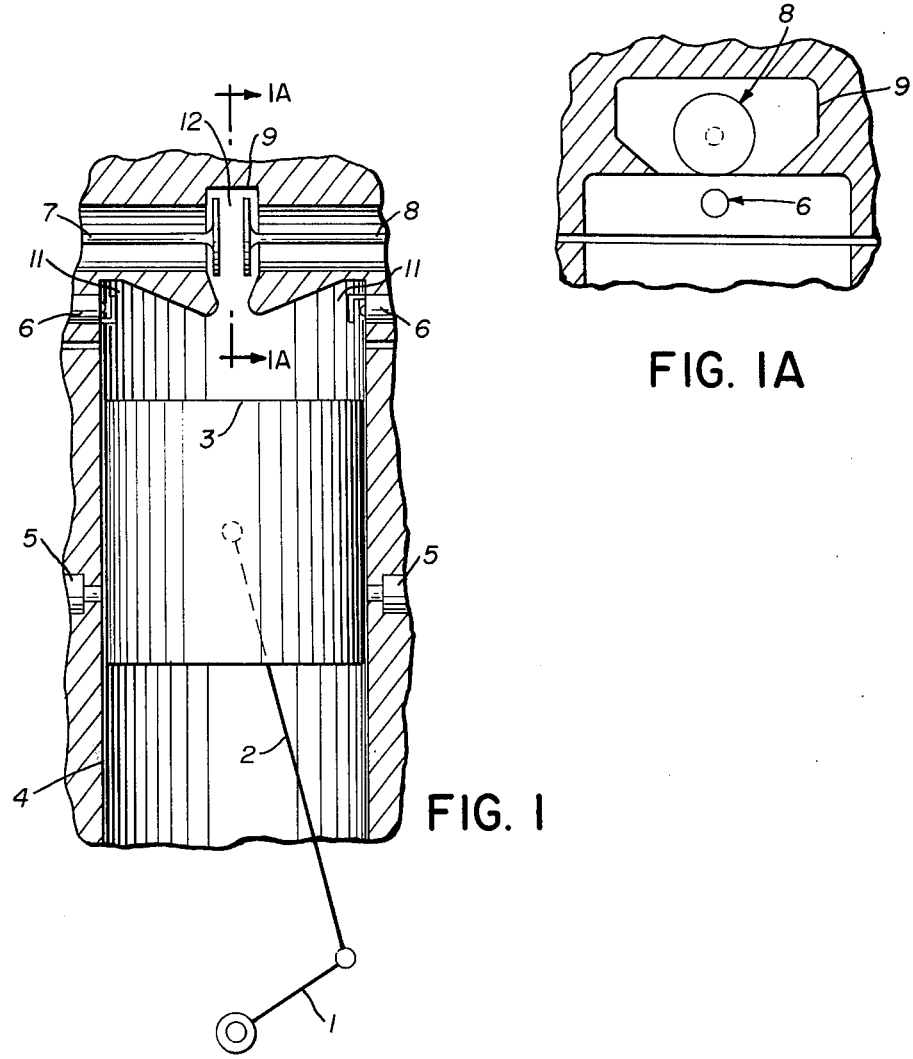

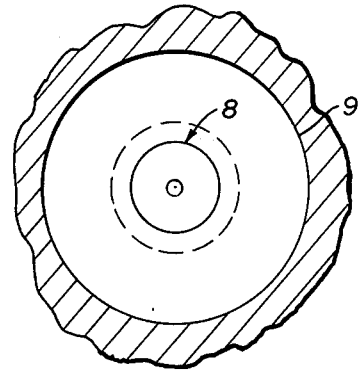
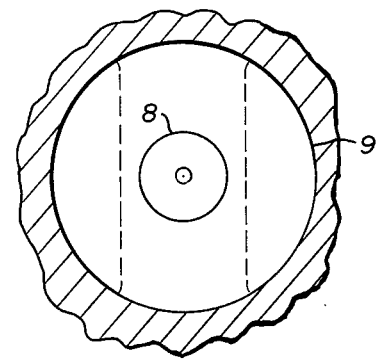
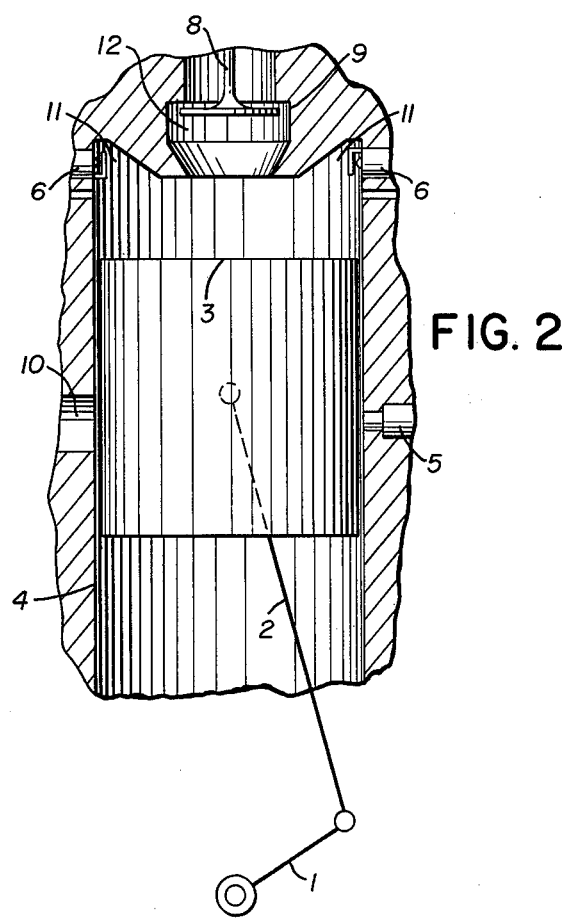

CLEAN SPARK IGNITION INTERNAL COMBUSTION ENGINE

This application is a continuation-in-part of my former application Ser. No. 376,304, filed 7-5-73, now abandoned.

My invention is a renovation of the existing and successful Honda CVCC four-stroke spark ignition engine which employs two inlet valves to admit lean and rich air-fuel mixtures from two separate carburetors to the cylinder. The cylinderhead of said Honda engine has a recess to accommodate the inlet valve for rich mixture, and is so shaped as to keep the rich mixture from being completely mixed with the lean mixture outside the recess and in the cylinder. Thus two separate pockets of lean and rich mixtures are formed at the end of compression stroke when the rich mixture inside the said recess is ignited by a spark plug. When the rich mixture is being burnt during the expansion stroke, the lean mixture outside the said recess will also be burnt when the flame front reaches it. The entry of lean mixture into combustion after the ignition of rich mixture by the spark plug promotes complete combustion and reduces air pollution.

The novelty of said Honda engine is the combination of the following features.

1. one additional inlet valve,
2. one additional carburetor, and
3. one separate recess in the cylinderhead to keep the lean mixture from being completely mixed with the rich mixture before ignition takes place. The disadvantages of said Honda engine as compared with conventional four-stroke spark ignition engines are as follows.

1. It is more expensive because of the additional inlet valve and its related mechanism.
2. It is more expensive because of the additional carburetor.
3. As compared with the simple compact such as hemispherical cylinderhead of a conventional engine, the recessed cylinderhead of said Honda engine has larger surface area to lose heat and thus reduce efficiency. Also the length of flame path from the spark plug to the remotest point of cylinderhead is longer, and thus the tendency of detonation is larger with said Honda engine.

My invention is a renovation of said Honda engine. As shown in the FIGS. 1 and 2 of the schematic diagram of four-stroke and two-stroke engines respectively, the elements are numbered as follows.

1 = crankshaft
2 = connecting rod
3 = piston
4 = cylinder
5 = fuel injector
6 = spark plugs
7 = suction valve
8 = exhaust valve
9 = cylinderhead
10 = scavenging port
11 = first chamber
12 = second chamber, also called a recess There may be one or more fuel injectors and spark plugs, depending on the size of the engine. The cylinderhead is divided into two chambers, namely the first chamber and the second chamber. The first chamber is located on top of the cylinder, and the second chamber is attached to the first chamber from the top, and looks like a separate recess in the cylinderhead. The spark plugs are located in the first chamber, and the inlet and exhaust valves are located in the second chamber.

My invention covers the four-stroke and the two-stroke cycle spark ignition internal combustion engines using gasoline or similar fuels. Fuel is injected when the piston is at or near its bottom dead center or the end of the suction stroke. Also an extra lean mixture or pure air is sucked into the cylinder through an intake valve in the case of a four-stroke engine, or through the scavenging port in the case of a two-stroke engine. The working modes of the engines of my invention are similar to that of said Honda engine except the feature of injecting fuel directly into the cylinder when the piston is at or near its bottom dead center or the end of the suction stroke. This causes a layer of rich air-fuel mixture at the top of the piston where the heat of the piston can quickly evaporate the fuel. As the piston travels in its compression stroke, the turbulence will cause further mixing of air and fuel. If there were enough time for such mixing, the air-fuel mixture would become homogeneous throughout the cylinder. In a real engine, however, the time interval for said compression stroke is extremely short. Therefore, the said mixing cannot be thorough, and the mixture at the top of the piston is richer than the mixture at the cylinderhead when the piston is near its top dead center, or when the ignition starts. Furthermore, the lean mixture in the said second chamber will remain relatively lean as has been proved in said Honda engine due to the fact that the said second chamber is a recess so as to keep the lean mixture from being completely mixed with the rich mixture in the said first chamber. The spark plugs are located in the first chamber, and are near the piston top when the piston reaches said top dead center. Therefore, when the spark plugs give ignition, the mixture surrounding them is rich enough to get ignited. Then the lean mixture trapped in the said second chamber is ignited as the flame front reaches there, and its excessive air will mix with the unburnt rich mixture and burn it more completely due to the violent turbulence and high temperature generated during the explosion. Such a working mode has been proved successful in said Honda engine. Although the working mode of my invention is similar to that of said Honda engine, the equipments employed and their combination are different.

I claim:

1. In a four-stroke spark ignition engine having fuel injectors in the cylinder wall and a combustion chamber in the cylinderhead, the stratification of air-fuel mixture is obtained by the combined employment and unique arrangement of such devices as said combustion chamber which is divided into two separate chambers, the first chamber being bounded by the piston top at or near the top dead center, the lower part of the cylinder-head, and a throat opening leading to the second chamber which is located on top of said first chamber; the inlet and exhaust valves which are located in said second chamber; the fuel injector or injectors which are located at or near the bottom dead center, and create atomized fuel droplets covering the vicinity of the piston top when injection takes place at the bottom dead center; and the spark plug or plugs which are located at or near the bottom of said first chamber, such that said stratification of air-fuel mixture is obtained with the rich mixture at or near the piston top during the end of intake stroke, and said stratification is maintained throughout the ensuing compression stroke due to the fact that the time interval of said compression stroke is extremely short as compared with the time required by natural diffusion or turbulence to undo said stratification such that at the instant of ignition a lean mixture is trapped in said second chamber, and a rich mixture is trapped in said first chamber where said spark plug or plugs give ignition to said rich mixture first, and the ignited mixture will reach more complete combustion later during the expansion stroke by mixing with the lean mixture released from said second chamber.

2. In a two-stroke spark ignition engine having fuel injectors in the cylinder wall and a combustion chamber in the cylinderhead, the stratification of air-fuel mixture is obtained by the combined employment and unique arrangement of such devices as said combustion chamber which is divided into two separate chambers, the first chamber being bounded by the piston top at or near the top dead center, the lower part of the cylinder-head, and a throat opening leading to the second chamber which is located on top of said first chamber; the exhaust valve which is located in said second chamber; the fuel injector or injectors which are located at or near the bottom dead center, and create atomized fuel droplets covering the vicinity of the piston top when injection takes place at the bottom dead center; and the spark plug or plugs which are located at or near the bottom of said first chamber, such that said stratification of air-fuel mixture is obtained with the rich mixture at or near the piston top during the end of scavenging, and said stratification is maintained throughout the ensuing compression stroke due to the fact that the time interval of said compression stroke is extremely short as compared with the time required by natural diffusion or turbulence to undo said stratification such that at the instant of ignition a lean mixture is trapped in said second chamber, and a rich mixture is trapped in said first chamber where said spark plug or plugs give ignition to said rich mixture first, and the ignited mixture will reach more complete combustion later during the expansion stroke by mixing with the lean mixture released from said second chamber.

3. In a four-stroke spark ignition engine, according to claim 1, said first and second combustion chambers are concentrical to each other.

4. In a two-stroke spark ignition engine, according to claim 2, said first and second combustion chambers are concentrical to each other.

* * * * *